United States Patent [19]

Schlund et al.

[11] Patent Number: 6,152,543
[45] Date of Patent: *Nov. 28, 2000

[54] ISOLATABLE CATALYST SYSTEM SUITABLE FOR THE POLYMERIZATION OF $C_2$-$C_{10}$-ALK-1-ENES

[75] Inventors: Rueger Schlund, Mannheim; Bernhard Rieger, Nehren, both of Germany

[73] Assignee: BASF Aktiengesellschaft, Ludwigshafen, Germany

[*] Notice: This patent issued on a continued prosecution application filed under 37 CFR 1.53(d), and is subject to the twenty year patent term provisions of 35 U.S.C. 154(a)(2).

[21] Appl. No.: 07/894,128

[22] Filed: Jun. 4, 1992

[30] Foreign Application Priority Data

Jun. 12, 1991 [DE] Germany ............... 41 19 343

[51] Int. Cl.⁷ ..................................... B01J 31/06
[52] U.S. Cl. ................. 302/109; 502/118; 526/159; 526/160; 526/348; 526/943
[58] Field of Search ..................... 502/109, 118; 526/159, 160, 348, 943

[56] References Cited

U.S. PATENT DOCUMENTS

| | | | |
|---|---|---|---|
| 4,098,979 | 7/1978 | Maemoto et al. | 526/904 |
| 4,404,344 | 9/1983 | Sinn et al. | 526/904 |
| 4,897,455 | 1/1990 | Welborn | 526/160 |
| 5,081,322 | 1/1992 | Winter et al. | 526/160 |

FOREIGN PATENT DOCUMENTS 63-92621  4/1988  Japan ..................... 526/904

OTHER PUBLICATIONS

English translation furnished.

Webster's Seventh New Collgiate Dictionary, G. & C Merriam Co, Springfield, Mass. (1963) p. 32.

*Primary Examiner*—David W. Wu
*Assistant Examiner*—Ling-Siu Choi
*Attorney, Agent, or Firm*—Keil & Weinkauf

[57] ABSTRACT

A catalyst system suitable for the polymerization of $C_2$–$C_{10}$-alk-1-enes comprising, as active ingredients, a complex compound of metals in Sub-groups IV and V of the Periodic Table and an oligomeric alumoxan compound is obtained by a procedure in which metals in Sub-groups IV and V of the Periodic Table are mixed with the oligomeric alumoxan compound and the resulting mixture is then applied to finely divided polymer. The catalyst system of the invention can be isolated after manufacture and is particularly suitable for the gas-phase polymerization of $C_2$–$C_{10}$-alk-1-enes.

5 Claims, No Drawings

ISOLATABLE CATALYST SYSTEM SUITABLE FOR THE POLYMERIZATION OF $C_2$-$C_{10}$-ALK-1-ENES

The present invention relates to a catalyst system suitable for the polymerization of $C_2$–$C_{10}$-alk-1-enes and comprising, as active ingredients, a complex compound of metals in Sub-groups IV and V of the Periodic Table and an oligomeric alumoxan compound, and obtainable by a procedure in which metals in Sub-groups IV and V of the Periodic Table are mixed with the oligomeric alumoxan compound and the resulting mixture is then applied to a finely divided polymer.

The invention also relates to a process for the preparation of the catalyst system of the invention, to a process for the polymerization of $C_2$–$C_{10}$-alk-1-enes and to the polymers resulting therefrom.

Catalysts suitable for the polymerization of alk-1-enes include insoluble Ziegler-Natta catalysts and soluble catalyst systems. The latter consist of complex compounds of metals in the Sub-groups IV and V of the Periodic Table with organic ligands, which can be used together with oligomeric aluminum compounds (EP-A 185,918, EP-A 283,739, and GB-A 2,207,136). The complex compounds used in such catalyst systems usually contain, as organic ligands, cyclopentadienyl groups which form a π-bond with the transition metal. Use is also frequently made of catalysts consisting of transition metal complexes which contain metal-bonded halogen in addition to organic ligands.

However, these soluble catalyst systems show only limited suitability for the polymerization of alk-1-enes from the gas phase, since it is usually necessary for catalyst components to be in the solid state when used for the polymerization of gaseous monomers.

EP-A 354,893 describes a catalyst system consisting of a complex compound of metals in Sub-groups IV and V of the Periodic Table and an oligomeric alumoxan compound, which system is contacted by polyolefins in a preliminary polymerization stage prior to the polymerization proper. The resulting catalyst system is not isolated but remains in the reactor in which it was formed for immediate further use as catalyst for the polymerization of alk-1-enes. Since, for process engineering reasons, catalyst systems used for gas-phase polymerization of alk-1-enes should be capable of being isolated and, usually, of being stored, the catalyst system described in EP-A 354,893 is substantially limited to applications involving solution polymerizations and suspension polymerizations.

Other catalyst systems for the polymerization of alk-1-enes are described in EP-A 381,184 and EP-A 384,171 and contain not only a complex compound of metals in Sub-groups IV and V of the Periodic Table and an aluminum compound but also a substrate consisting of an oxide of silicon or an oxide of aluminum or a polymer of styrene or ethylene. Here again, the catalyst systems cannot be isolated as such, and it is not therefore possible to carry out the desired polymerization independently of the preparation of the catalyst.

Yet other catalyst systems for the polymerization of alk-1-enes, which are described in the laid-open specifications EP-A 279,863 and EP-A 295,312, consist of a complex compound of metals in Sub-groups IV and V of the Periodic Table, an oligomeric alumoxan compound and an inorganic or organic support, for example silicon dioxide or a polyolefin. These catalyst systems are used, in particular, for the polymerization of ethylene. To improve their productivity, these catalyst systems, once they have been formed, are subjected to a preliminary polymerization step prior to the polymerization proper. This, however, increases the production costs of the catalyst system.

It is thus an object of the invention to overcome the aforementioned drawbacks by providing a supported catalyst system which is easy to isolate and store, which is suitable for use in suspension polymerizations, solution polymerizations and also gas-phase polymerizations, and which, moreover, can be prepared by a process involving minimum costs.

Accordingly, we have found the supported catalyst system described at the outset.

The active ingredients contained in the supported catalyst system of the invention comprise, inter alia, a complex compound of metals in Sub-groups IV and V of the Periodic Table, particularly titanium, zirconium, hafnium, vanadium, niobium, or tantalum. Use is preferably made of complex compounds in which the metal atom is bonded to unsaturated cyclic hydrocarbon atoms, for example to cyclopentadienyl, fluorenyl, or indenyl groups, via π-bonds. The complex compounds preferably used are also characterized in that the metal atom may be further linked to other ligands, particularly to fluorine, chlorine, bromine, iodine, or $C_1$–$C_8$-alkyl such as methyl, ethyl, propyl, or butyl. Particularly suitable complex compounds contain chlorine or bromine.

Complex compounds which are particularly well suited for inclusion in the catalyst system of the invention may be represented by formula I below

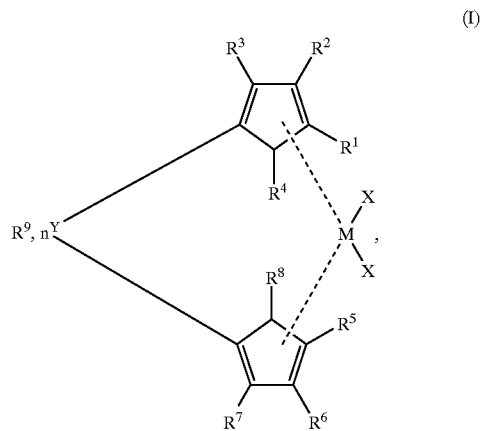

in which the substituents have the following values:
$R^1$ to $R^3$ and $R^5$ to $R^7$ hydrogen, $C_1$–$C_{10}$-alkyl, 5-membered to 7-membered cycloalkyl, which may in turn be substituted by $C_1$–$C_6$-alkyl, also $C_6$–$C_{15}$-aryl, or $C_6$–$C_{15}$-arylalkyl, where, optionally, two adjacent radicals $R^1$ and $R^2$, $R^2$ and $R^3$, $R^5$ and $R^6$, or $R^6$ and $R^7$ may together form an unsaturated cyclic group of from 4 to 15 carbon atoms,
$R^4$, $R^8$ hydrogen, $C_1$–$C_4$-alkyl,
$R^9$ $C_1$–$C_8$-alkyl, $C_3$–$C_{10}$-cycloalkyl, $C_6$–$C_{10}$-aryl,
M titanium, zirconium, hafnium, vanadium, niobium, or tantalum,
Y silicon, germanium, tin, sulfur, or carbon,
X fluorine, chlorine, bromine, iodine, or $C_1$–$C_8$-alkyl, and
n is an integer from 0 to 2, preferably 2.

Some examples of particularly suitable complex compounds are the following:
Dimethylsilane-diyl-bis(3-t-butyl-5-methylcyclopentadienyl)zirconium dichloride, diethylsilane-diyl-bis(3-t-butyl-5-methylcyclopentadienyl) zirconium dichloride,
methylethylsilane-diyl-bis(3-t-butyl-5-methylcyclopentadienyl )zirconium dichloride,
dimethylsilane-diyl-bis(3-t-butyl-5-ethylcyclopentadienyl) zirconium dichloride,
dimethylsilane-diyl-bis(3-t-pentyl-5-methylcyclopentadienyl)zirconium dichloride,
dimethylsilane-diyl-bis(3-t-butyl-5-methylcyclopentadienyl )dimethylzirconium,
dimethylsilane-diyl-bis(2-methylindenyl)zirconium dichloride, diethylsilane-diyl-bis(2-methylindenyl) zirconium dichloride,
dimethylsilane-diyl-bis(2-ethylindenyl)zirconium dichloride,
dimethylsilane-diyl-bis(2-isopropylindenyl)zirconium dichloride,
dimethylsilane-diyl-bis(2-t-butylindenyl)zirconium dichloride,
diethylsilane-diyl-bis(2-methylindenyl)zirconium dibromide,
dimethylsulfide-bis(2-methylindenyl)zirconium dichloride,
dimethylsilane-diyl-bis(2-methyl-5-methylcyclopentadienyl )zirconium dichloride,
dimethylsilane-diyl-bis(2-methyl-5-ethylcyclopentadienyl) zirconium dichloride,
dimethylsilane-diyl-bis(2-ethyl-5-isopropylcyclopentadienyl)zirconium dichloride,
dimethylsilane-diyl-bis(2-methylindenyl)zirconium dichloride,
dimethylsilane-diyl-bis(2-methylbenzindenyl)zirconium dichloride, and
dimethylsilane-diyl-bis(2-methylindenyl)hafnium dichloride.

The synthesis of such complex compounds can be effected by known methods, in which it is preferred to react the appropriately substituted cyclic hydrocarbon anions with halides of titanium, zirconium, hafnium, vanadium, niobium, or tantalum. Examples of relevant synthesis processes are described, for example, in *The Journal of Organometallic Chemistry*, 369 (1989), 359–370.

In addition to the complex compound, the catalyst system of the invention contains oligomeric alumoxane compounds of the general formula II of III

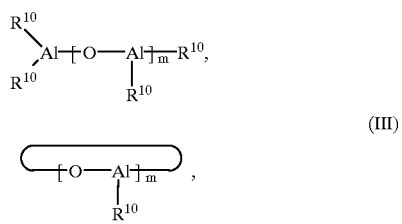

in which $R^{10}$ preferably stands for methyl or ethyl and m is a number from preferably 10 to 25.

The synthesis of these oligomeric alumoxane compounds is carried out in conventional manner by reacting a solution of trialkylaluminum with water and is described in, for example, EP-A 284,708 and U.S. Pat. No. 4,794,096.

The resulting oligomeric alumoxan compounds are usually in the form of a mixture of both linear and cyclic chain molecules of various lengths, so that m must be regarded as a mean value. The alumoxan compound may also contain trialkylaluminum compounds having from 1 to 8 carbon atoms in the alkyl moiety, examples of which are trimethylaluminum, triethylaluminum, and methyldiethylaluminum.

When the catalyst system of the invention is to be used for the polymerization of $C_2$–$C_{10}$-alk-1-enes, it is advantageous to adjust the quantities of metals in Sub-groups IV and V of the Periodic Table and of the oligomeric alumoxane compound used such that the atomic ratio of the aluminum in the oligomeric alumoxane compound to the transition metal in the complex compound of metals in Sub-groups IV and V of the Periodic Table ranges from 10:1 to $10^6$:1, preferably from 10:1 to $10^4$:1.

According to the invention, the complex compound of metals in Sub-groups IZ and V of the Periodic Table is mixed with the oligomeric alumoxan compound to give an activated catalyst system, this being carried out prior to any polymerization. This activating step generally takes from 1 to 120 minutes, preferably from 10 to 100 minutes, and mixing is preferably carried out by contacting the complex compound with a solution of the oligomeric alumoxane compound in an inert solvent such as benzene, toluene, hexane, or heptane, the temperature being from 0° to 50° C.

The resulting solution is then applied to a finely divided polymer. This is done in two stages. In the first stage, the finely divided polymer is combined with the solution of oligomeric alumoxane compound and complex compound as produced in the activating step and the conglomeration is stirred for from 1 to 120 minutes, preferably from 10 to 60 minutes, at a temperature of from 10° to 50° C. In the second stage, the solvent is evaporated off, with the result that a solid, supported catalyst system can be isolated. The finely divided polymer used for the production of the supported catalyst system of the invention is preferably one having an average particle size distribution ranging from 0.01 mm to 1.0 mm, preferably from 0.1 mm to 0.5 mm. Highly suitable polymers for this purpose are, in particular, polyvinyl chloride, polystyrene, and polyolefins, especially polypropylene.

Polymers of alk-1-enes can be produced with the aid of this isolatable supported catalyst system. Such polymers include homo- and co-polymers of $C_2$–$C_{10}$-alk-1-enes, the monomers used being preferably ethylene, propylene, but-1-ene, pent-1-ene, and hex-1-ene. The catalyst system of the invention is particularly suitable for the polymerization of propylene and for the copolymerization of propylene with minor amounts of other $C_2$–$C_{10}$-alk-1-enes, especially ethylene and but-1-ene.

The production of such polymers may be carried out batchwise or, preferably, continuously in reactors normally used for the polymerization of alk-1-enes. One such reactor is a continuous stirred autoclave, and it is possible to use a cascade comprising a number of in-line stirred autoclaves.

The polymerization is carried out at a pressure of from 1 to 3000 bar and a temperature of from 0° to 300° C. We prefer to use pressures ranging from 1 to 2500 bar and temperatures ranging from 0° to 150° C. The polymerization usually takes from 0.5 to 10 hours.

Polymerizations carried out with the aid of the catalyst system of the invention can take place in the gas phase, in a suspension, in liquid monomer or in an inert solvent. In the latter case, it is preferred to use liquid hydrocarbons such as benzene or toluene as solvent, the amount of solvent used being advantageously such that from $10^{-4}$ to $10^{-1}$ mole of aluminum in the form of alumoxane is present per liter of solvent. Polymerization in the gas-phase, in a suspension, or in liquid monomer also produces polymers exhibiting good properties for industrial applications.

The average molar mass of the polymers formed can be controlled by the methods normally employed in polymerization engineering, for example by the introduction of chain stoppage regulators such as hydrogen, or by varying the reaction temperature. The supported catalyst system of the invention comprising the complex compound and the oligomeric alumoxane compound may be supplemented during the polymerization by further oligomeric alumoxane in the form of a solution in an inert hydrocarbon such as hexane, if desired. This supplementary alumoxan compound may again contain trialkylaluminum compounds having from 1 to 8 carbon atoms in the alkyl moiety, for example trimethylaluminum, triethylaluminum, and methyldiethylaluminum.

The polymers produced using the supported catalyst system of the invention are characterized by a relatively high melting point and a reduced content of fines (polymer particles of a size lower than 0.125 mm). This is particularly evident in polymers made by gas-phase polymerization. The supported catalyst systems of the invention can be isolated and stored for prolonged periods of, say, several months, without appreciable loss of the high productivity characteristic of these systems. This makes the catalyst systems of the invention particularly suitable for use in the gas-phase polymerization of alk-1-enes. The polymers of $C_2$–$C_{10}$-alk-1-enes thus produced are particularly useful for the production of sheet and molded articles.

EXAMPLE 1

A. Preliminary Activation 11.9 mg (0.026 mmole) of dimethylsilane-diyl-bis(indenyl)zirconium dichloride were added to a 1.6 molar solution of methylalumoxane (average chain length m=1 7) in 6.6 ml of toluene in a glass flask having a capacity of 0.1 l. These two catalyst components were then stirred together for 20 minutes at 20° C. The resulting solution contained aluminum and zirconium in an atomic ratio of 406:1.

B. Application to Substrate 2 g of polypropylene grits having an average particle size distribution of from 0.25 mm to 0.5 mm were suspended in 10 ml of toluene in a glass flask having a capacity of 0.1 l and then combined with 6.6 ml of the solution obtained in the preliminary activation step and stirred for 30 minutes at 20° C. The toluene was then evaporated off at 20° C. under a pressure of approx. 0.01 bar.

This gave a supported catalyst system comprising 2 g of polypropylene grits and 0.4 g of active catalyst consisting of zirconium complex and methylalumoxane. It was possible to store this supported catalyst system for a period of 2 months without it suffering any appreciable loss of activity.

C. Polymerization 2.4 g of the supported catalyst system obtained in stage B were placed in a stirred autoclave having a capacity of 10 l, together with 0.9 g of the same methylalumoxan as used in stage A, in 20 ml of heptane. The atomic ratio of aluminum to zirconium in the polymerization reactor was 1200:1. Polymerization of propylene was then carried out in the presence of approx. 7 l of liquid propylene at a temperature of 50° C. and under a pressure of 20.5 bar over a period of 1 20 minutes.

There were obtained 680 g of polypropylene. The melting point and particle size distribution of this polypropylene are given in the Table below, which also includes data on the productivity of the catalyst (quantity of polypropylene produced in relation to the total amount of catalyst system used).

EXAMPLE 2

A. Preliminary Activation

Using a method analogous to Example 1, 20.4 mg (0.049 mmole) of dimethylsilane-diyl-bis(cyclopentadienyl) zirconium dichloride were mixed with a 1.6 molar solution of 1.06 g of methylalumoxane (average chain length m=17) in 11.5 ml of toluene. The resulting solution contained aluminum is and zirconium in an atomic ratio of 380:1.

B. Application to Substrate

Using a method analogous to Example 1, 2 g of the same polypropylene grits were combined with the solution obtained in the preliminary activation step.

This gave a supported catalyst system comprising 2 g of polypropylene grits and 1.1 g of active catalyst consisting of zirconium complex and methylalumoxan. It was possible to store this supported catalyst system for a period of 2 months without it showing any appreciable loss of activity.

C. Polymerization

Using a method analogous to Example 1, 1.5 g of the supported catalyst system obtained in stage B and a suspension of 0.9 g of the same methylalumoxane as used in stage A, in 20 ml of heptane, were used for the polymerization of propylene. Unlike Example 1, the polymerization was carried out using gaseous propylene at a temperature of 70° C. and under a pressure of 28 bar, with no liquid propylene being present. The atomic ratio of aluminum to zirconium in the polymerization reactor was 1233:1.

Following a polymerization time of 120 minutes, there were obtained 150 g of polypropylene. The melting point and particle size distribution of this polypropylene are given in the Table below, which also includes data on the productivity of the catalyst (quantity of polypropylene produced in relation to the total amount of catalyst system used).

EXAMPLE 3

A. Preliminary Activation

Using a method analogous to Example 1, 9.1 mg (0.18 mmole) of dimethylsilane-diyl-bis(indenyl)zirconium dichloride were mixed with a 1.6 molar solution of 0.46 g of methylalumoxan (average chain length m =1 7) in 5 ml of toluene. The resulting solution contained aluminum and zirconium in an atomic ratio of 400:1.

B. Application to Substrate

Using a method analogous to Example 1, 1 g of the same polypropylene grits were combined with the solution obtained in the preliminary activation step.

This gave a supported catalyst system comprising 1.0 g of polypropylene grits and 0.5 g of active catalyst consisting of zirconium complex and methylalumoxane. It was possible to store this supported catalyst system for a period of 2 months without it showing any appreciable loss of activity.

C. Polymerization

Using a method analogous to Example 2, 1.5 g of the supported catalyst system obtained in stage B and a suspension of 0.9 g of the same methylalumoxane as used in stage A, in 20 ml of heptane, were used for the polymerization of propylene from the gas phase. The atomic ratio of aluminum to zirconium in the polymerization reactor was 1202:1.

Following a polymerization time of 120 minutes, there were obtained 370 g of polypropylene. The melting point and particle size distribution of this polypropylene are given in the Table below, which also includes data on the productivity of the catalyst (quantity of polypropylene produced in relation to the total amount of catalyst system used).

TABLE

| Properties of Polypropylene | Examples | | |
|---|---|---|---|
| | 1 | 2 | 3 |
| Melting point [° C.] | 140 | 153 | 133 |
| Particle size distribution [%] | | | |
| >2 mm | 22.9 | 9.6 | 60.4 |
| >1 mm–2 mm | 30.9 | 22.5 | 28.0 |
| >0.5 mm–1.0 mm | 13.7 | 28.9 | 8.4 |
| >0.25 mm–0.5 mm | 5.4 | 14.0 | 2.3 |
| >0.125 mm–0.25 mm | 5.6 | 16.5 | 0.9 |
| <0.125 mm | 21.6 | 8.4 | 0.0 |
| Productivity of catalyst [g/g] | 404 | 101 | 261 |

The parameter 'productivity of catalyst' in the above Table refers to the weight of polypropylene produced per unit weight of zirconium complex and methylalumoxane used.

We claim:

1. A catalyst system for the polymerization of $C_2$–$C_{10}$-alk-1-enes comprising, as active ingredients, a complex compound of a metal and an oligomeric alumoxane compound and obtained by a) mixing a complex compound having the formula (I)

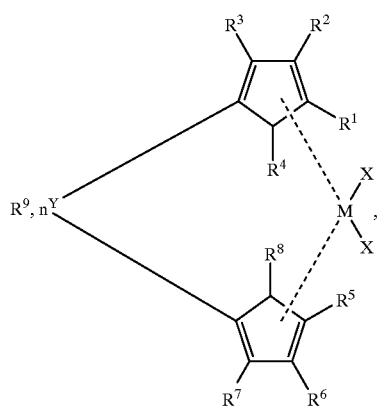

(I)

in which the substituents have the following meaning:
$R^1$ to $R^3$ and $R^5$ to $R^7$ hydrogen, $C_1$–$C_{10}$-alkyl, 5-membered to 7-membered cycloalkyl, which may in turn be substituted by $C_1$–$C_6$-alkyl, $C_6$–$C_{15}$-aryl, or $C_6$–$C_{15}$-arylalkyl, where, optionally, two adjacent radicals $R^1$ and $R^2$, $R^2$ and $R^3$, $R^5$ and $R^6$ or $R^6$ and $R^7$ may together form an unsaturated cyclic group of from 4 to 15 carbon atoms, $R^4$, $R^8$ hydrogen, $C_1$–$C_4$-alkyl, $R^9$ $C_1$–$C_8$-alkyl, $C_3$–$C_{10}$-cycloalkyl, $C_8$–$C_{10}$-aryl M titanium, zirconium or hafnium, Y silicon, germanium, tin, sulfur, or carbon, X fluorine, chlorine, bromine, iodine, or $C_1$–$C_8$-alkyl, and n is 0, 1 or 2, with a solution of the oligomeric alumoxane compound and (b) applying the resulting mixture to finely divided polypropylene having particle sizes ranging from 0.01 mm to 1 mm.

2. The catalyst system of claim 1, which is obtained by mixing said complex compound of a metal said oligomeric alumoxane compound for a period of from 1 to 120 minutes.

3. The catalyst system of claim 1, wherein the finely divided polypropylene has particle sizes ranging from 0.1 mm to 0.5 mm.

4. The catalyst system of claim 1, wherein the atomic ratio of aluminum in the oligomeric alumoxane compound to transition metal in the complex compound of a metal ranges from 10:1 to $10^6$:1.

5. A process for the preparation of a catalyst system suitable for the polymerization of $C_2$–$C_{10}$-alk-1-enes comprising, as active ingredients, a complex compound of a metal and an oligomeric alumoxane compound, which consists essentially of a) mixing a complex compound having the formula (I)

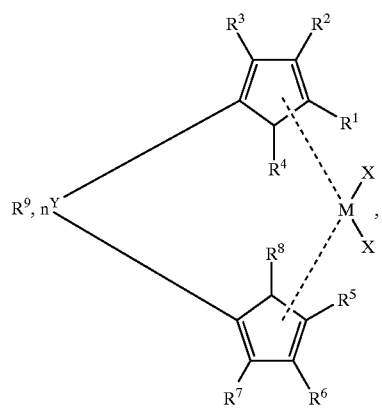

(I)

in which the substituents have the following meaning:
$R^1$ to $R^3$ and $R^5$ to $R^7$ hydrogen, $C_1$–$C_{10}$-alkyl, 5-membered to 7-membered cycloalkyl, which may in turn be substituted by $C_1$–$C_6$-alkyl, $C_6$–$C_{15}$-aryl, or $C_6$–$C_{15}$-arylalkyl, where, optionally, two adjacent radicals $R^1$ and $R^2$, $R^2$ and $R^3$, $R^5$ and $R^6$ or $R^6$ and $R^7$ may together form an unsaturated cyclic group of from 4 to 15 carbon atoms, $R^4$, $R^8$ hydrogen, $C_1$–$C_4$-alkyl, $R^9$ $C_1$–$C_8$-alkyl, $C_3$–$C_{10}$-cycloalkyl, $C_8$–$C_{10}$-aryl M titanium, zirconium or hafnium, Y silicon, germanium, tin, sulfur, or carbon, X fluorine, chlorine, bromine, iodine, or $C_1$–$C_8$-alkyl, and n is 0, 1 or 2, is mixed with a solution of the oligomeric alumoxane compound and b) the resulting mixture is applied to finely divided polypropylene having particle sizes ranging from 0.01 to 1 mm.

* * * * *

UNITED STATES PATENT AND TRADEMARK OFFICE
CERTIFICATE OF CORRECTION

PATENT NO. : 6,152,543
DATED : November 28, 2000
INVENTOR(S) : Schlund et al.

It is certified that error appears in the above-identified patent and that said Letters Patent is hereby corrected as shown below:

<u>Column 8, claim 2,</u>
Line 2, after "metal" insert -- with --.

Signed and Sealed this

Twenty-fifth Day of September, 2001

Attest:

NICHOLAS P. GODICI
*Attesting Officer*    *Acting Director of the United States Patent and Trademark Office*